United States Patent
Avidor et al.

(10) Patent No.: US 10,410,358 B2
(45) Date of Patent: Sep. 10, 2019

(54) IMAGE PROCESSING WITH OCCLUSION AND ERROR HANDLING IN MOTION FIELDS

(71) Applicant: SAMSUNG ELECTRONICS CO., LTD., Suwon-si, Gyeonggi-Do (KR)

(72) Inventors: Tomer Avidor, Petah Tikva (IL); Omri Govrin, Pardes Hana Karur (IL); Dan Gluck, Kadima (IL)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 141 days.

(21) Appl. No.: 15/633,108

(22) Filed: Jun. 26, 2017

(65) Prior Publication Data

US 2018/0374218 A1    Dec. 27, 2018

(51) Int. Cl.
*G06T 7/246*    (2017.01)

(52) U.S. Cl.
CPC .... *G06T 7/246* (2017.01); *G06T 2207/20021* (2013.01)

(58) Field of Classification Search
None
See application file for complete search history.

(56) References Cited

U.S. PATENT DOCUMENTS

| | | | |
|---|---|---|---|
| 2010/0225741 A1* | 9/2010 | Hong | H04N 13/00 348/43 |
| 2011/0142289 A1* | 6/2011 | Barenbrug | G06T 7/11 382/107 |
| 2014/0010307 A1* | 1/2014 | Gilmutdinov | H04N 7/0132 375/240.16 |
| 2014/0133569 A1* | 5/2014 | Alpert | H04N 19/51 375/240.16 |

OTHER PUBLICATIONS

Lucas, et al., "An Iterative Image Registration Technique With an Application to Stereo Vision," Proc 7th Intl Joint Conf on Artificial Intelligence (IJCAI) 1981, Aug. 24-28, Vancouver B.C., pp. 674-679.

(Continued)

*Primary Examiner* — Vikkram Bali
(74) *Attorney, Agent, or Firm* — F. Chau & Associates, LLC

(57) ABSTRACT

Methods, devices and computer-readable mediums for detecting occlusions which occur due to foreground object movement with respect to a background between first and second successive frames. Occlusion detection may use motion estimation with respect to at least a third frame temporally preceding the first frame. Occlusion detection may be based on one or more assumptions such as: occlusion motion vectors are different than other background motion vectors; occlusion motions are likely to be similar to foreground occluding motion; and/or motion estimation will match an occlusion block with a block belonging to a common background object. Occlusion detection may be combined with motion error detection based on a motion field divergence using a motion vector assigned to the occlusion, e.g., for generating an intermediate frame in frame up rate conversion (FRUC).

14 Claims, 18 Drawing Sheets

(56) References Cited

OTHER PUBLICATIONS

De Haan, et al., "True-Motion Estimation With 3-D Recursive Search Block Matching," IEEE Transaction on Circuits and Systems for Video Technology, vol. 3, No. 5, Oct. 1993, pp. 368-379.
Bruhn, et al., "Lucas/Kanade Meets Horn/Schunck: Combining Local and Global Optice Flow Methods," International Journal of Computer Vision 61(3), 2005, pp. 211-231.
G. de Haan, "Motion Estimation and Compensation an Integrated Approach to Consumer Display Field Rate Conversion", ISBN:90-7445-01-2, Sep. 1992, 316 pages.
Mertens, et al., "A Block-Based Motion Estimator Capable of Handling Occlusions," MVA 2000.

* cited by examiner

FG(WOMAN) MOVING LEFT $I_0(t_0)$

MOTION ESTIMATION RESULT $I_{0-1}(t_{0-1})$

IMAGE PROCESSING WITH OCCLUSION AND ERROR HANDLING IN MOTION FIELDS

BACKGROUND

Technical Field

The present disclosure relates generally to image processing using motion vectors, and to occlusion detection in video.

Discussion of the Related Art

Various video processing applications use motion estimation algorithms to calculate the way pixels move between consecutive images in video. Current algorithms, however, are constrained in their ability to estimate motion accurately for either occluded regions within a scene or for movements that are too complex. An "occluded" region may denote a background region in a frame which is occluded by a foreground object but which becomes visible in a succeeding frame due to the foreground object movement relative to the background (or vice versa). An occluded region may also refer to a background region in a preceding frame that becomes occluded in a current frame due to such movement. Most motion estimation algorithms either do not account for occluded regions or use motion smoothness constraints to solve ambiguous regions. Some algorithms detect occlusions based on the motion fields but do not account for erroneous regions.

Some examples of complex movement include: complex deformations like a butterfly swinging its wings; sudden appearance/disappearance of objects (e.g. lightning, explosions) and motion blurred objects due to high speed movement. The added processing burden for handling complex and fast movement presents a particular challenge in motion estimation when hardware simplicity is desirable.

FIG. 1 is an example still image 10 of a video for illustrating occlusion regions. A first foreground object 12 and a second foreground object 14 are moving to the right and cover portions of a background 15. In a next temporal frame, the background region 16 to the right of the first object 12 will be occluded—this occlusion region 16 may be referred to as a "front-end occlusion". Meanwhile, the background region 18 to the left of the second object 14 was covered by the second object 14 in a preceding frame but is now visible. This occlusion region 18 may be called a "tail-end occlusion".

Various types of image processing applications employ occlusion region identification calculations as part of the overall processing task. Examples include video compression, image fusion, 3D rendering, and frame rate up conversion (FRUC). In FRUC, one or more intermediate images is hallucinated (e.g. interpolated) between two consecutive images in a video in order to raise the video frame rate and produce smoother motions. The construction of the intermediate image is done using a motion vector field that is calculated between consecutive frames. Applications that use motion estimation are, often times, highly susceptible to erroneous motion vectors and do not function properly in such conditions.

SUMMARY

In an illustrative embodiment, a method performed by a processor detects occlusions within a first frame with respect to a second, temporally subsequent frame of a sequence of frames of video. The method may determine that a first block of image data in the first frame is an occlusion based at least on (i) a comparison of a first motion vector from the first block to the second frame and a second motion vector from the first block to a third frame of the sequence of frames temporally preceding the first frame, and (ii) a comparison between the second motion vector and a second order motion vector from the second frame to the first frame. Information regarding the occlusion may then be output for error reduction processing of the video.

Another illustrative method includes: (i) detecting an occlusion in a video frame and assigning a motion vector to the occlusion; and (ii) identifying a block of image data in the video frame containing a motion error by computing a motion field divergence using the assigned motion vector.

Electronic devices that perform the methods are also disclosed.

BRIEF DESCRIPTION OF THE DRAWINGS

The above and other aspects, features and advantages of the present technology will become more apparent from the following detailed description, taken in conjunction with the accompanying drawings in which like reference numerals indicate like elements or features, wherein.

DETAILED DESCRIPTION

The following description, with reference to the accompanying drawings, is provided to assist in a comprehensive understanding of certain exemplary embodiments of the technology disclosed herein for illustrative purposes. The description includes various specific details to assist a person of ordinary skill the art with understanding the claimed subject matter, but these details are to be regarded as merely illustrative. For the purposes of simplicity and clarity, descriptions of well-known functions and constructions may be omitted when their inclusion may obscure appreciation of the present technology by a person or ordinary skill in the art. In this document, the singular forms "a", "an" and "the" are intended to encompass the plural forms as well, unless the context clearly indicates otherwise.

Embodiments of the present technology are directed to a processor-implemented method that utilizes an algorithm to detect errors in the motion fields as well as occlusions, and is able to classify them as either occlusion or error. Different corrections may be implemented for occlusions than for errors.

Applications that use motion estimation are, often times, highly susceptible to erroneous motion vectors and do not function properly in such conditions. Embodiments described herein may detect these errors in the motion estimation fields, while disambiguating between occlusions and errors, and correct them in a way that benefits an application using the motion vector fields. Such motions if not corrected normally may cause artifacts such as halo (for occlusions—see FIG. 4A discussed later) and breakups (for erroneous motions—see FIG. 4B).

Embodiments provide a system for detecting and correcting occlusions and errors in a motion field that is simple and robust. The technology may simplify an otherwise complex processing task and use mainly local data. For instance, the technique may avoid the need for storing pixel data in generated interpolation frames, and thereby may use less memory space than otherwise required. With these attributes, the technology may be amenable to a hardware oriented implementation.

The below description demonstrates the technology's usefulness on Frame Rate Up Conversion (FRUC). The technology, however, may be used for any application in which it is desirable or necessary to calculate occlusions and/or to alleviate the deleterious effects of motion errors.

Other example applications include but are not limited to video compression, 3D rendering and image fusion.

Figure 2:
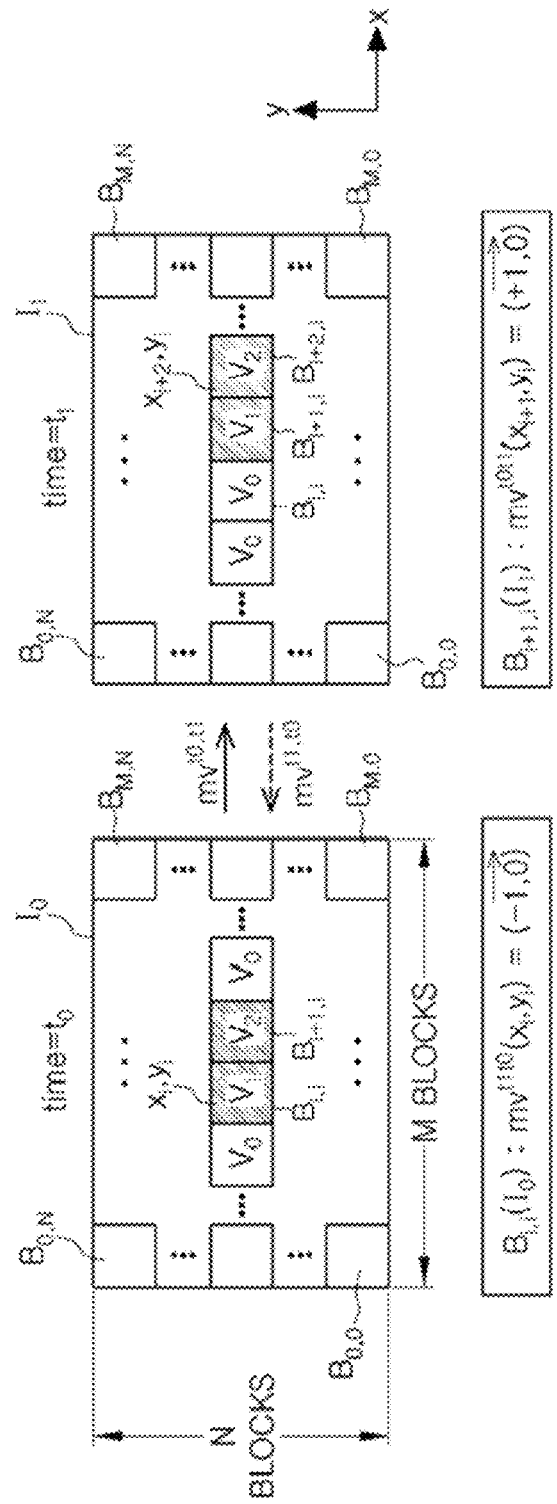
FIG. 2 schematically depicts an example of sequential 2D frames of image data.

FIG. 2 schematically depicts an example of sequential two dimensional (2D) frames of image data, to provide a foundation for terminology and concepts in the description hereafter. First and second frames $I_0$ and $I_1$ (displayable at times $t_0$ and $t_1$) of a sequence of video frames are each composed of an N×M array of pixel blocks $B_{0,0}$ to $B_{M,N}$ (N rows×M columns). Each block may be composed of only a single pixel or a set of pixels (e.g., a macroblock or a tile, such as an 8×8 or 16×16 block of pixels). In the example depicted, a block Bi,i represents a portion of a foreground object, has a coordinate xi, yi and a pixel value $V_1$, while nearby background blocks have pixel values of $V_0$. The foreground object comprised of blocks $B_{i,i}$ and $B_{i+1,i}$ of frame $I_0$ is shown to move to the right between $t_0$ and $t_1$ by one block length.

Motion vectors $mv^{t0t1}$ and $mv^{t1t0}$ represent temporal motion between times $t_0$ and $t_1$ of a block under consideration in the forward and reverse temporal directions, respectively. Thus, considering block $B_{i,i+1}$ of frame $I_1$ (with coordinates $x_{i+1}$, $y_i$), when for example it is desired to use frame $I_0$ as a reference frame to avoid transmitting actual pixel data for frame $I_1$, the value $V_1$ for the block $B_{i,i+1}$ can be derived by just providing the motion vector $mv^{t0t1}$ ($x_{i+1}$, $y_i$)=(+1, 0), along with a prediction error for that block to precisely reconstruct the actual data, if known. (The motion vector and prediction errors may be expressed with a smaller amount of data than the actual pixel data.) Similarly, in the case of just transmitting/storing pixel data for frame $I_1$ and avoid transmitting/storing pixel data for frame $I_0$, the value $V_1$ for block $B_{i,i}$ of frame $I_0$ can be derived using the motion vector for block $B_{i,i}$, which is expressed as $mv^{t1t0}$ ($x_i$, $y_i$)=(−1, 0).

In the FRUC example of the present technology below, a frame $I_{0-1}$ is created via interpolation between frames $I_0$ and $I_1$, using the knowledge of predicted (computed) occlusion regions. The blocks of this interpolated frame $I_{0-1}$ may be provided purely as motion vectors (without prediction errors as in a "P" or "B" frame of the MPEG standard, since actual data for the interpolated frame is unknown).

Figure 3A:
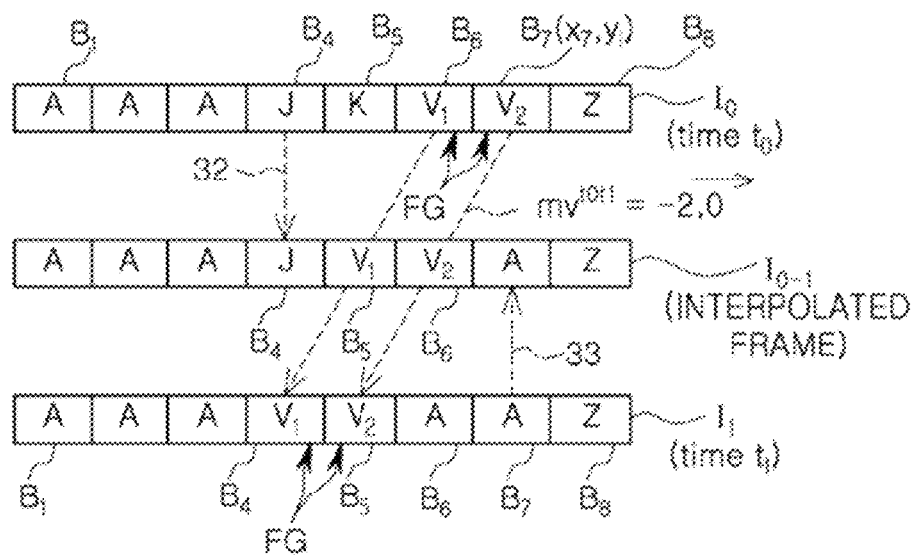
FIG. 3A schematically illustrates movement of a foreground object and resulting occlusion regions in a single row of blocks between successive frames.

FIG. 3A schematically illustrates movement of a foreground object and resulting occlusion regions in a single row of blocks between successive frames, and how knowledge of such movement may be generally useful in FRUC. Here, a foreground object FG represented by blocks B6 and B7 in frame $I_0$ moves to positions of blocks B4 and B5 in frame $I_1$. Blocks B6, B7 of frame $I_0$ have values V1, V2, whereas neighboring background blocks B4, B5 and B8 have values J, K and Z, respectively. A motion vector $mv^{t0t1}$=(−2, 0) expresses this foreground object movement. The foreground object FG is determined to occupy blocks B5 and B6 of an interpolated frame $I_{0-1}$ (temporally halfway between $I_0$ and $I_1$) based on the projection of the motion vector $mv^{t0t1}$.

Figure 1:
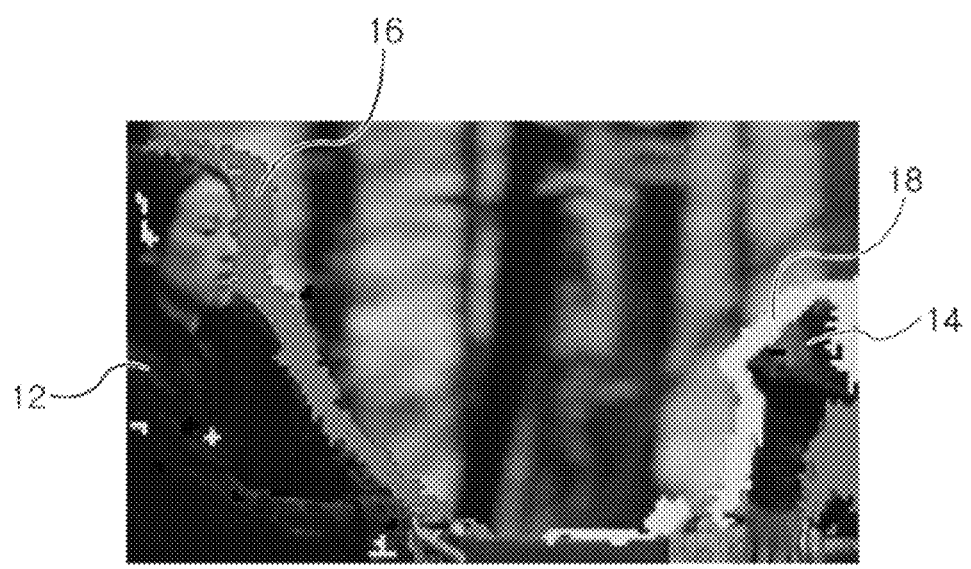
FIG. 1 is an example still image of a video for illustrating occlusions.

Meanwhile, blocks B4 and B5 of frame $I_0$ become occluded in frame $I_1$ at time $t_1$ by the foreground object movement. Thus, the region encompassed by blocks B4 and B5 in frame $I_0$ may be considered a "front-end occlusion" as mentioned earlier in connection with FIG. 1. If this occlusion region is detected correctly via a motion algorithm, in the case of FRUC, the interpolated frame $I_{0-1}$ may be generated with a correct value J for block B4, as depicted by arrow 32. (A vertical arrow in this diagram represents a motion vector of zero, representing zero motion between consecutive frames for that block.)

Figure 3B:
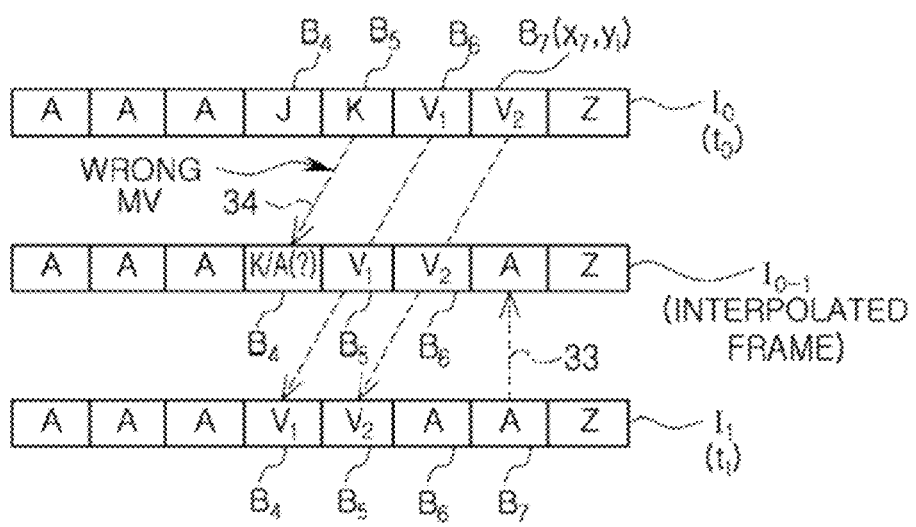
FIG. 3B illustrates a foreground object movement scenario with an erroneous motion vector condition.

FIG. 3B illustrates the same foreground object movement scenario as in FIG. 3A, but for the case in which a wrong motion vector is computed for block B5 of frame $I_0$. Here, a motion vector 34 for the block B5 is wrongly computed as representing approximately the same motion as for the foreground object FG. In this case, the block B4 may be wrongly assigned a value K or A or an interpolation between K and A, or the like, resulting in a visual artifact when the frames are rendered.

Figure 4A:
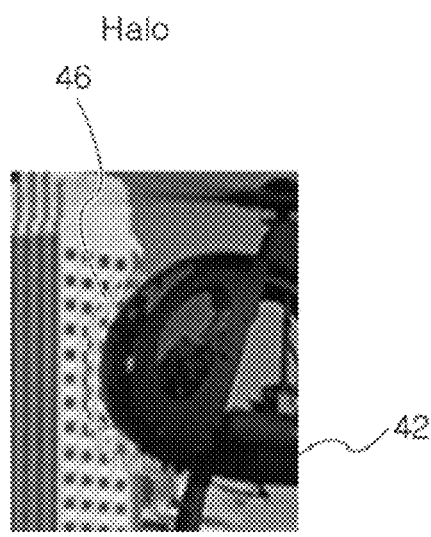
FIG. 4A shows an experimental example of artifacts generated in a video image due to an occlusion error.
Figure 4B:
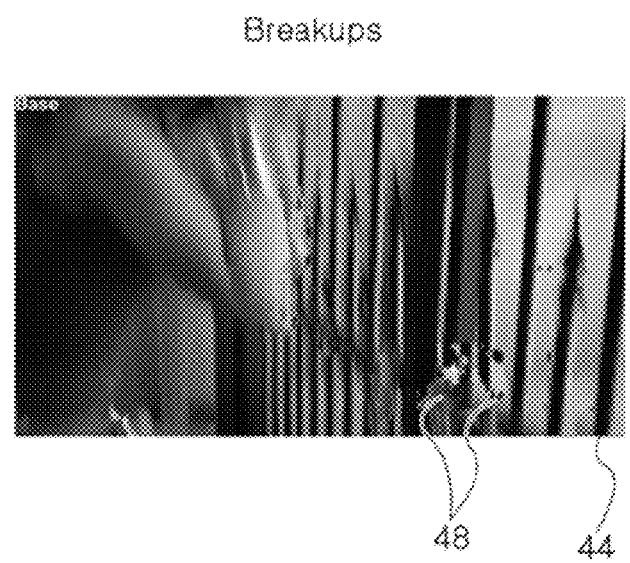
FIG. 4B depicts an experimental example of artifacts generated in a video image, due to erroneously computed motions.

FIG. 4A shows an experimental example of artifacts generated in a video image due to an occlusion error (e.g., a wrongly calculated occlusion region, or an incorrect motion vector assigned to an occlusion region). In this example, an artifact in the form of a halo 46 is produced in a frame of an image 42 due to the occlusion error. FIG. 4B depicts another experimental example of artifacts generated in a video image, due to erroneously computed motions. Here, artifacts in the form of breakups 48 are generated in an image 44 due to the motion errors.

The technology according to the present disclosure may reduce or obviate such errors with processing circuitry configured to execute an algorithm that: i) detects occlusions; ii) "solves" occlusions (e.g. by replacing occluded motion vectors); iii) detects erroneous motion vectors; and, iv) reconstructs erroneous regions.

Figure 5:
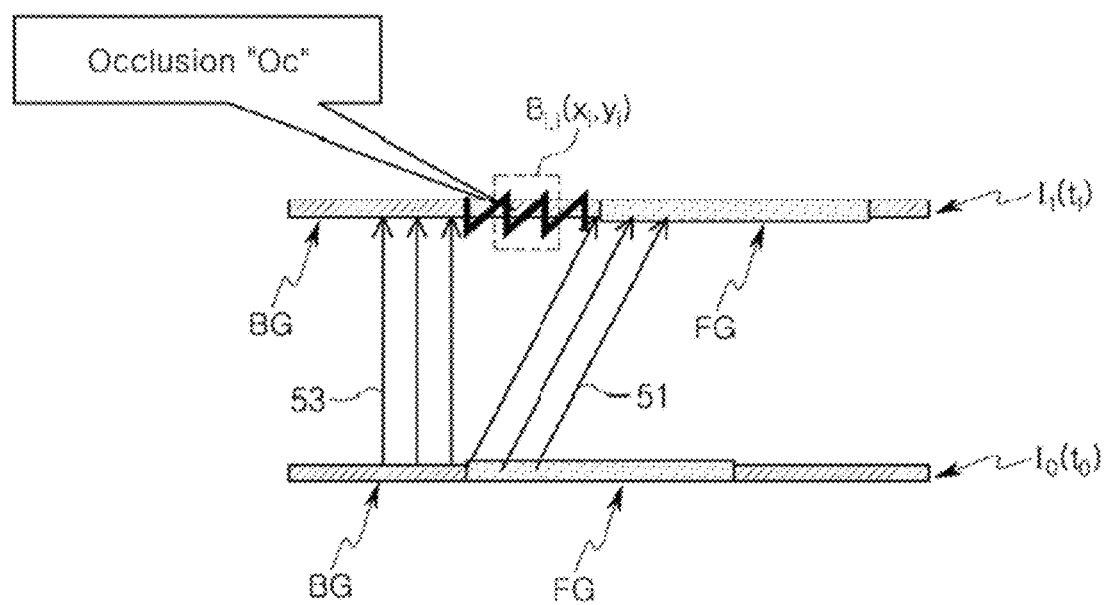
FIG. 5 schematically illustrates foreground object movement between successive frames in a video, to illustrate principles of occlusion detection in accordance with the present technology.

FIG. 5 schematically illustrates foreground object movement between successive frames in a video, to illustrate principles of occlusion detection in accordance with the present technology. A single row of pixels in each frame, i.e., a 1D example, is illustrated for ease of understanding, but it is of course understood that the methods described herein are applicable to 2D frames and even 3D frames. A foreground object FG is shown to move rightwards according to a motion vector 51 from frame $I_0$ at time $t_0$ to frame $I_1$ at $t_1$. A background image BG is assumed to be motionless between $t_0$ and $t_1$. This is illustrated by the vertically oriented motion vector 53, which represents zero motion of background pixels located to the immediate left of the object FG in frame $I_0$. An occlusion region (interchangeably, just "occlusion") Oc thus formed contains one or more blocks $B_{i,i}$ at coordinates $x_i$, $y_i$, between the left edge of the foreground object FG and the right edge of the background region BG in frame (An occlusion region is depicted in the figures herein as spanning the region of the "meander lines" wrapping around pixel blocks.) It is noted here that in the diagram of FIG. 5 and similar type diagrams hereafter, the foreground object is exemplified as moving to different pixel block locations from one frame to another while the background remains constant. These examples are only for illustrating relative movement between the foreground and background. In many scenes, a foreground object moves in the real world but the recording camera also moves, so that from frame to frame, the foreground object appears in about the same pixel block location within the frame. In this case, the background motion, referenced to the pixel blocks, can be more significant than the foreground motion. The occlusion detection and solution examples herein are of course equally applicable to this scenario, as well as a scenario in which both the foreground object and the background move differently in the real world.

An occlusion Oc may be preliminarily detected and subsequently confirmed with an algorithm symmetric with respect to time, and described using a motion vector $MV^{t_0 t_1}$ as follows:

With continuing reference to FIG. 5, given images $I_0$ and $I_1$, let $MV^{t_0 t_1}$ be the motion of any given block $B_{i,i}$ under consideration from $I_0$ to $I_1$. An occlusion Oc may be preliminarily detected using some form of reference counting. For instance, a reference count $ref_{t_1}$ on block $B_{i,i}$ of frame $I_1$ may be implemented by projecting all motion vectors projecting back from block $B_{i,i}$ of image $I_0$ on to $I_1$. That is, $$ref_{t_1}(x_i,y_i) = |\{(x,y) | \|(x,y)+mv^{t_0 t_1}(x,y)-(x_i,y_i)\| < threshA\}| \quad \text{(eqn. 1).}$$

Thus, an occlusion Oc may be preliminarily detected as a block having a low reference count, i.e. the reference count is lower than a threshold. For example, it is seen in FIG. 5 that a low number of motion vectors (zero) originating from blocks in frame $I_0$ such as mv's 51, 53 project to (or "intersect with") blocks such as $B_{i,i}$ in the occlusion region Oc. Therefore, the reference count is below a predefined threshold threshA of 1.0 or higher, and the blocks within the region Oc are each detected as occlusion blocks. Note that the determination of the motion vectors in the first place may be based on known algorithmic schemes employing block matching between blocks of adjacent frames. Also, if either frame $I_0$ or $I_1$ is originally provided as a prediction frame, e.g., a P or B frame in MPEG, and referenced to the other frame $I_1$ or $I_0$, then the motion vectors may be already available. Some examples of suitable block matching algorithms are described in the following publications: (i) True-motion estimation with 3-D recursive search block matching, G. de Haan et al., IEEE Transactions on Circuits and Systems for Video Technology (Volume: 3, Issue: 5, October 1993); (ii) PatchMatch: A Randomized Correspondence Algorithm for Structural Image Editing, C. Barnes et al., ACM Transactions on Graphics (Proc. SIGGRAPH), August 2009; and (iii) Lucas/Kanade Meets Horn/Schunck: Combining Local and Global Optic Flow Methods. Andrés Bruhn et al., International Journal of Computer Vision February 2005, Volume 61, Issue 3, pp 211-231. Other known block matching algorithms are also available. In FRUC or video compression, a block match algorithm as in (i) or (ii) may typically be used. For more accuracy such as in medical imaging some form of the Lucas Kanade algorithm as in (iii), or an alternative, may be used.

In the case of an occlusion block, the identical block is not present in the adjacent frame, and therefore a block matching algorithm could find that zero motion vectors intersect with an occlusion block. However, embodiments of the present technology are premised on the recognition that occluded regions tend to have high self similarity, leading to motion vectors in occluded regions being biased towards either foreground motion or some random motion. This is because for an occlusion block, background motion will match it to the foreground while foreground motion will match it to the background (in the target image). And, since a background region has high self similarity while the match of a foreground block to a background block will be low, the estimated motion will be biased towards foreground motion.

For instance, motion estimation (ME) errors may result from an aperture problem of image registration algorithms, and attempts at smoothing constraints to handle it. The aperture problem in ME stems from the fact that motion is a problem with two variables and one equation, and therefore it cannot be solved without smoothness constraints. This is prevalent in most or all ME algorithms since most pixels do not contain enough information for a good match. Mathematically, the image structure tensor needs to have two non zero eigenvalues for a good match. In non-mathematical terms, in order to get a good match for an image block, the block should have an edge; and moving objects only have edges on their boundaries. Hence, the inner part of the object can only be solved using diffusion/smoothness from the boundary. For this reason most or all ME algorithms have smoothness constraints. In the examples herein below, the occluded regions are preliminarily detected using the smoothness constraint, leading to foreground motion, or will just have some random motion.

Thus, since motion vector algorithms are imperfect, some (erroneous) motion vectors may be computed as belonging to an occluded region and cause errors in the reference count. To alleviate these errors, only consistent motion vectors may be used in the occlusion detection calculation. A motion vector $mv^{t_0,t_1}$ (x,y) may be considered consistent, if and only if, $$\|mv^{t_0,t_1}(x,y) - mv^{t_1,t_0}(x + mv_x^{t_0,t_1}, y + mv_y^{t_0,t_1})\| < \text{thresh}B, \quad (\text{eqn. 2})$$

where threshB is a positive real number. Eqn. (2) may be considered to represent a condition in which a reverse motion vector from a block Bi,i ($I_1$) closely approximates the corresponding forward motion vector to the block Bi,i ($I_0$), where the forward and reverse motion vectors are calculated independently from different reference frames ($I_0$ or $I_1$) using the block matching algorithm.

Therefore, the reference condition may become:

$$\text{ref}_{t_1}(x_i, y_i) = |\{(x,y) | \|(x,y) + mv^{t_0,t_1}(x,y) - (x_i, y_i)\| < \text{thresh}A \wedge \|mv^{t_0,t_1}(x,y) - mv^{t_1,t_0}(x + mv_x^{t_0,t_1}, y + mv_y^{t_0,t_1})\| < \text{thresh}B\}| < \text{occ\_thresh}. \quad (\text{eqn. 3})$$

However, a scheme relying only on reference counts to detect occlusions may not be robust against errors in the motion field. Motion estimation algorithms tend to err for regions where the data correlation is ambiguous, e.g., in smooth areas, areas with periodic patterns, and areas where the texture is not unique (such as a background pattern of vertical lines).

Figure 6A:
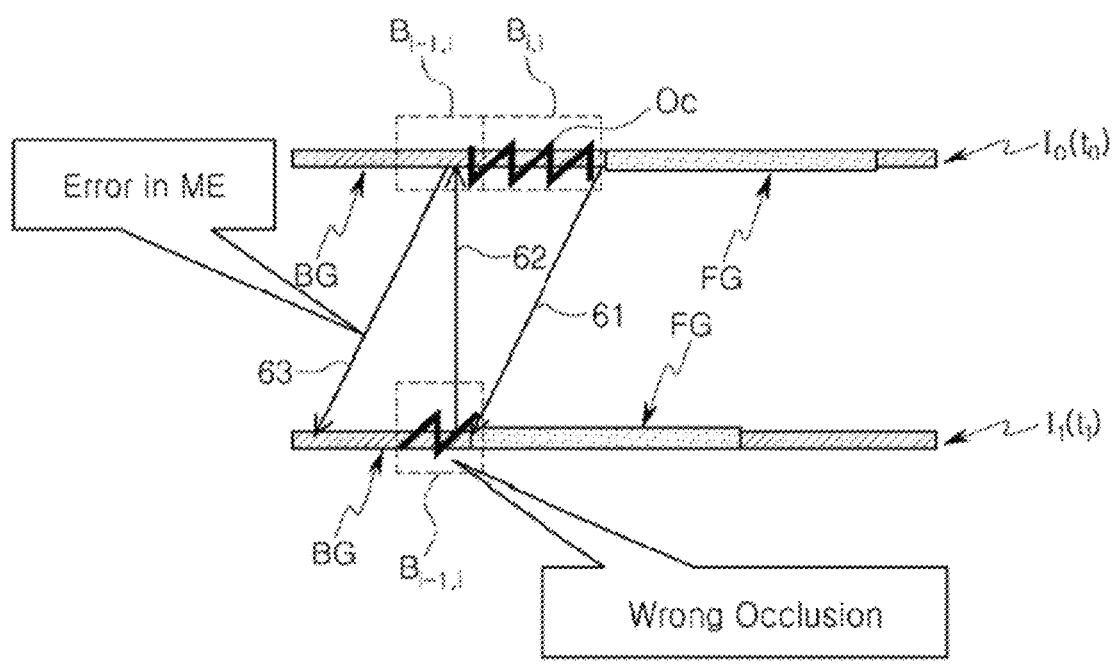
FIG. 6A schematically illustrates how an erroneous motion vector assignment can lead to an incorrectly detected occlusion, which may in turn generate artifacts.

FIG. 6A schematically illustrates how an erroneous motion vector assignment can lead to an incorrectly detected occlusion, which may in turn generate artifacts. One common way such motion estimation error may occur is when an occluded region is smooth and the motion estimation algorithm struggles to determine the occluded region. In the example, a foreground object FG moves to the left between frames $I_0$ and $I_1$, where motion vector 61 represents this leftward motion. Meanwhile, a background region BG remains constant, so as to form a front-end occlusion region Oc with block Bi,i in frame $I_0$.

Assuming the occlusion detection scheme employing eqn. 3 above, FIG. 6A shows an example in which an error occurs in a computed motion vector (mv) 63 projecting from Block $B_{i-1,i}$ of $I_0$ towards $I_1$. That is, instead of a zero magnitude mv, the mv 63 resembles mv 61, such that an erroneous motion is predicted for the block just outside the actual occlusion region of $I_0$. The error in motion vector 63 causes a low reference count in region of Block $B_{i-1,i}$ ($I_1$) and, thereby, a wrong classification of an occlusion. That is, zero mv's project onto $B_{i-1,i}$ ($I_1$), whereas in the reverse direction, an mv 62 is computed correctly for the motionless background pixels. This type of error is a common occurrence when the occluded region is smooth, like in the example of FIG. 6B. This error is common due to two factors discussed above, i.e., 1) motion estimation algorithms use smoothness to solve the aperture problem (and since the occluded region is smooth, this becomes significant); and 2) occluded regions are biased towards foreground motion.

Figure 6B:
FIG. 6B is an experimental image corresponding to an image in FIG. 6A.
Figure 6C:
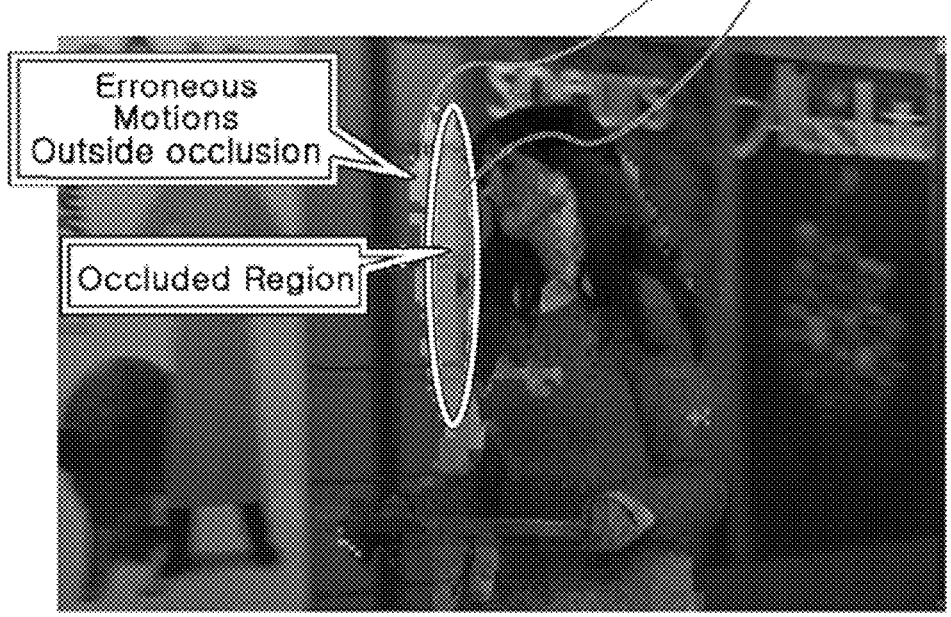
FIG. 6C is an experimental interpolated image associated with images in FIG. 6A.

FIG. 6B shows an experimental image $I_0$ corresponding to $I_0$ in FIG. 6A. The woman represents the foreground object FG moving leftward. In FIG. 6C, a frame $I_{0-1}$, which in the case of FRUC is a frame interpolated between $I_0$ and $I_1$ following the occlusion detection scheme using eqn. (3), erroneous motion 66 is seen generated outside an occlusion region 68. In FRUC, when an interpolated block is calculated, it may be based on a motion vector from image $I_0$ that belongs to an occlusion and a different motion vector from image $I_1$ that also belongs to an occlusion. This is an ambiguous scenario and more information is needed to solve it correctly. Mistakes in solving it could lead to border replication artifact, as illustrated in the figure.

In non-FRUC applications, the frame in FIG. 6C could just represent a decompressed frame with motion errors. For video compression algorithms, errors in an occlusion calculation could cause the algorithm to conclude that there are more changes in the video and will typically cause higher bandwidth consumption.

Figure 7A:
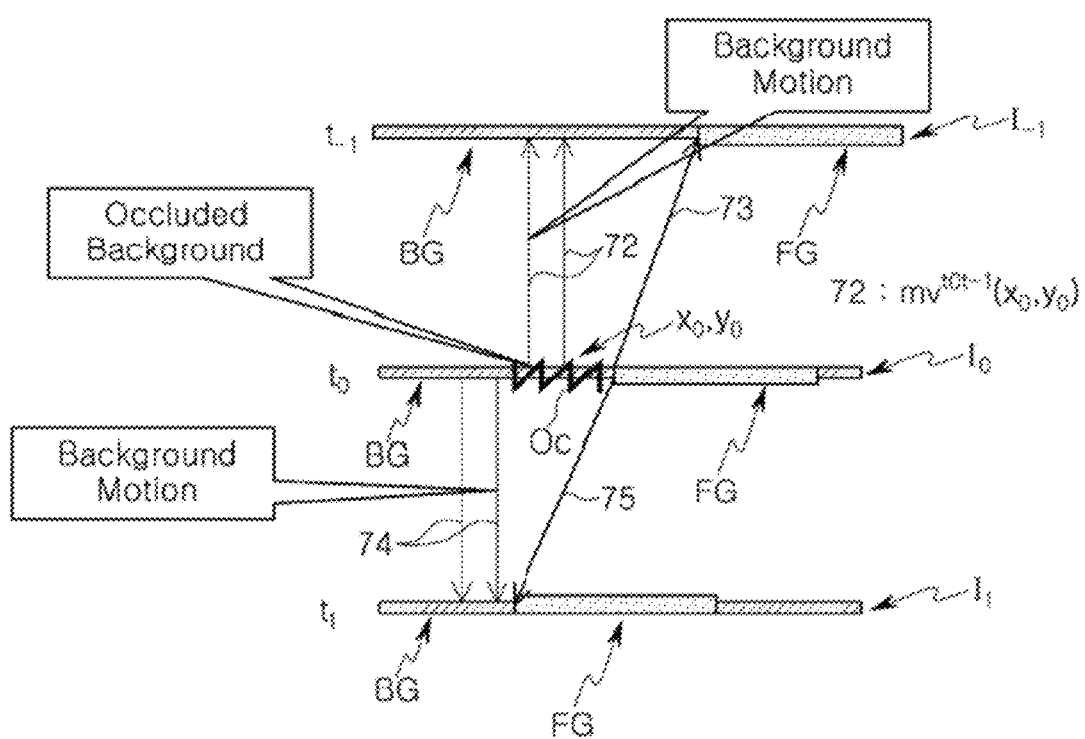
FIG. 7A is a diagram illustrating movement of a foreground object FG between three successive frames and an occlusion formed thereby.
Figure 7B:
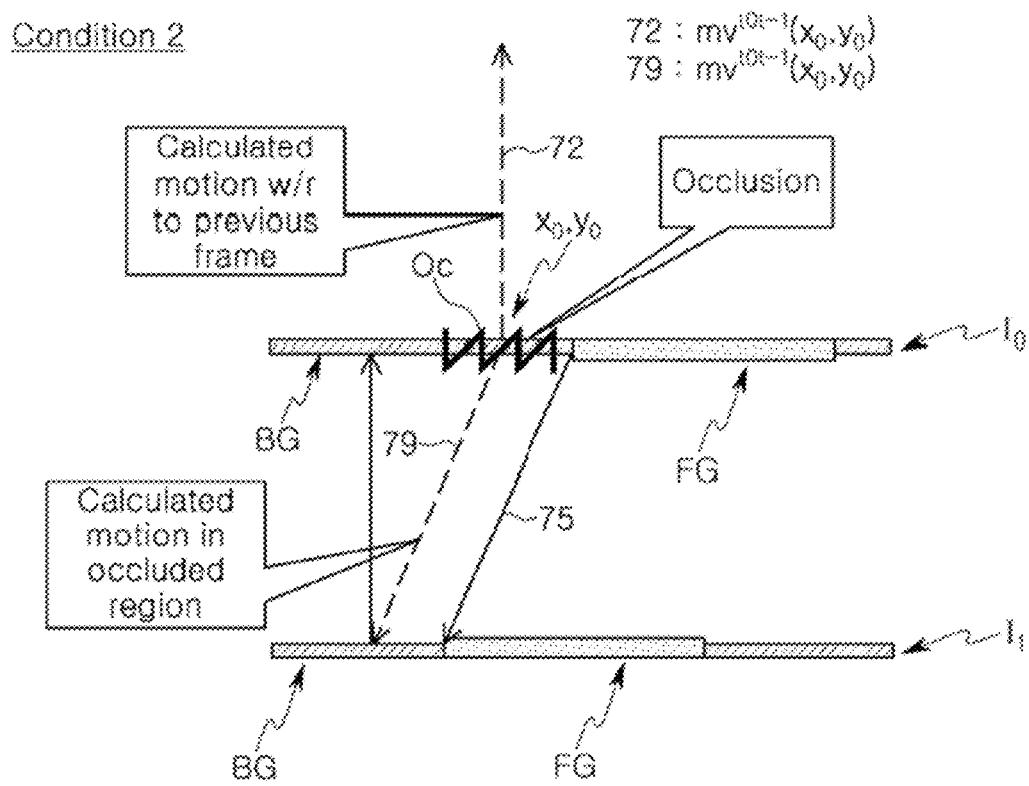
FIG. 7B illustrates object movement between frames to illustrate a condition in an example Motion Priors method.
Figure 7C:
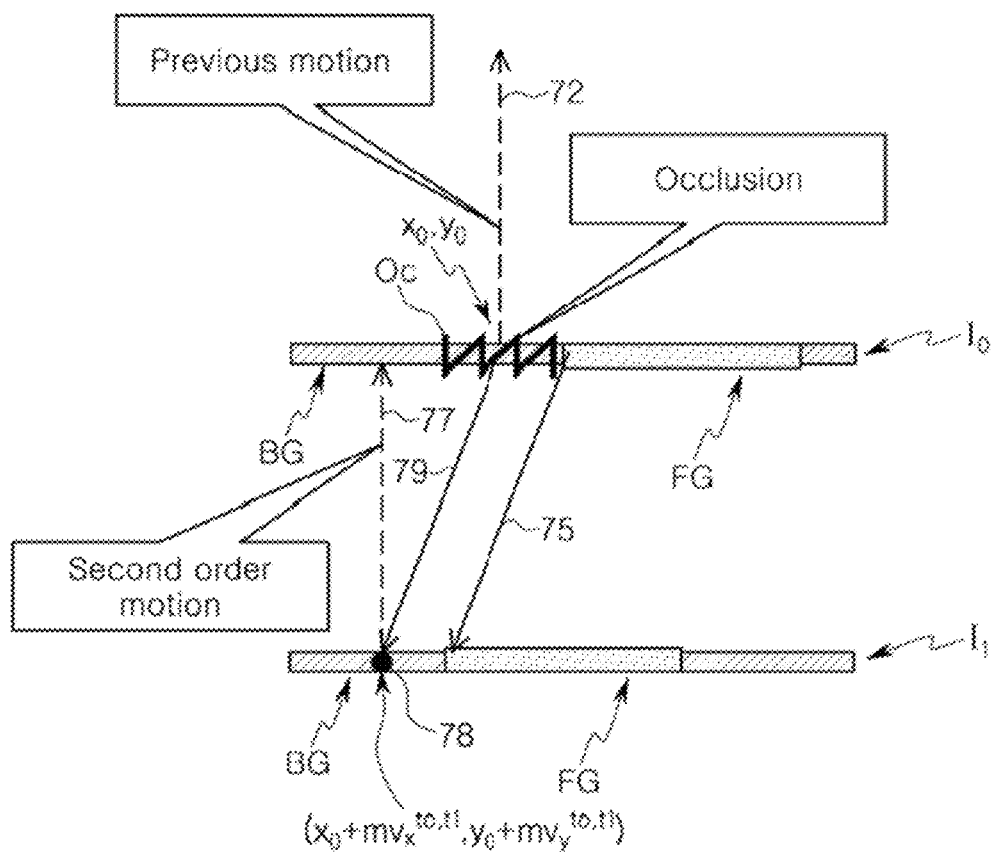
FIG. 7C illustrates object movement between frames to illustrate another condition in the example Motion Priors method.

FIGS. 7A-7C collectively illustrate an enhanced method of detecting occlusions according to the present technology. It is desirable to add robustness to occlusion detection based just on reference counting to account for the possibility of errors as described above. The following motion vector priors (i.e., prior probabilities) may be added as factors in an overall algorithmic-based method (hereafter referred to as a Motion Priors method) to characterize occlusion vectors and by that disambiguate between actual occlusion and non-occlusion vectors. Motion priors may be as follows:

1. Occlusion motion vectors are different than the background motion vectors.
2. Occlusion motions have a "high" likelihood of being similar to the foreground (occluding) motion.
3. Motion estimation will match an occlusion block with a block belonging to the same background (occluded) object.

From these priors stem an "Occlusion condition" given a motion vector $M^{t_0,t_1}$ ($x_0,y_0$) at a given pixel block's coordinates ($x_0,y_0$) between images at times $t_0$ and $t_1$. Then $M^{t_0,t_1}$ ($x_0,y_0$) of a current frame $I_0$ at time $t_0$ may represent an occlusion iff the following three conditions are satisfied:

1. Low reference count condition: $|\{(x,y) | \|(x,y) + mv^{t_1,t_0}(x,y) - (x_0,y_0)\| < \text{thresh}1 \wedge \|mv^{t_1,t_0}(x,y) - mv^{t_0,t_1}(x + mv_x^{t_1,t_0}, y + mv_y^{t_1,t_0})\| < \text{thresh}2\}| < \text{occ\_thresh}$.
2. Difference from previous frame backwards motion condition: $\|mv^{t_0,t_1}(x_0,y_0) + mv^{t_0,t_{-1}}(x_0,y_0)\| > \text{thresh}3$.
3. Second order motion condition: $\|mv^{t_0,t_{-1}}(x_0,y_0) - mv^{t_1,t_0}(x_0 + mv_x^{t_0,t_1}, y_0 + mv_y^{t_0,t_1})\| < \text{thresh}4$.

Conditions 2-3 use motion with respect to a previous frame, where it is assumed that for an occluded (background) coordinate ($x_0,y_0$) of the current frame, the "correct" background motion $mv^{t_0,t_1}$ ($x_0,y_0$) is equal to $mv^{t_0,t_{-1}}$ ($x_0,y_0$). This is depicted in FIG. 7A, which gives an example of a foreground object FG moving continually to the left from a previous frame $I_{-1}$ at time $t_{-1}$ to a current frame $I_0$ and a succeeding frame $I_1$. The foreground object movement, represented by mv's 73 and 75, generates an occlusion Oc at coordinates $x_0,y_0$ in frame $I_0$. The "correct" background motion from $I_0$ to $I_1$, represented by mv 74 ($mv^{t_0,t_1}$ ($x_0,y_0$)) equals the background motion from $I_0$ to $I_{-1}$ ($mv^{t_0,t_{-1}}$ ($x_0,y_0$)) represented by mv 72.

FIG. 7B depicts object movement between frames and motion vectors to illustrate condition 2 in the Motion Priors method. Condition 2 implies that the motion calculated on an occluded pixel is more likely to be similar to the foreground motion than to the background motion since a background block is more likely to be similar to some other background block than to a foreground block. The example of FIG. 7B corresponds to the same foreground object motion between three successive frames as in FIG. 7A, resulting in the occlusion Oc. However, FIG. 7B assumes a motion vector 79, i.e., $mv^{t_0,t_i}$ ($x_0,y_0$), calculated from occlusion Oc towards I1. It is seen that mv 79 is more similar to the foreground mv 75 than to the background mv 72 ($mv^{t_0,t_{-1}}$ ($x_0,y_0$)). If mv 79 exceeds mv 72 in magnitude by more than thresh3, condition 2 is satisfied.

FIG. 7C depicts object movement between frames to illustrate condition 3 in the Motion Priors method. FIG. 7C illustrates the same foreground object motion scenario as in FIG. 7B, with mv 79 from occlusion Oc landing at coordinate 78, i.e., ($x_0+mv_x^{t0,t1}$, $y_0+mv_y^{t0,t1}$) in frame $I_1$. Second order motion is computed from coordinate 78, represented by mv 77 ($mv^{t1,t0}$ ($x_0+mv_x^{t0,t1}$,$y_0+mv_y^{t0,t1}$)). If the magnitude of mv 77 approximately equals the magnitude of mv 72, i.e., mv 72 and mv 77 differ in magnitude by less than thresh4, then condition 3 is satisfied. Thereby, an erroneous motion vector from an occlusion region may be determined.

Figure 8:
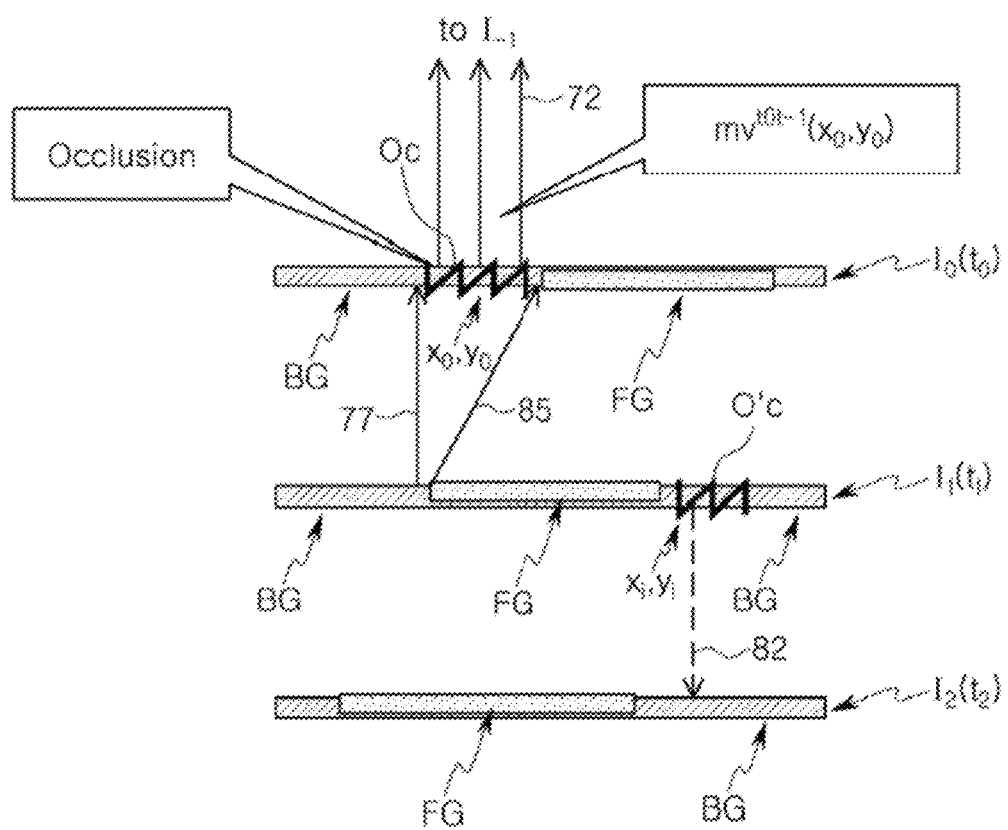
FIG. 8 illustrates an example of how occlusions may be "solved" in accordance with an example four frame based detection and solution method.

FIG. 8 illustrates an example of how occlusions may be "solved" in accordance with a four frame based detection and solution method of the present technology. Occlusions detected according to the occlusion conditions 1-3 discussed above may be solved using motion from the previous backwards field. Such occlusions may be solved according to the expression, $$mv^{t0,t1}(x_0,y_0) \leftarrow -mv^{t0,t-1}(x_0,y_0) \qquad \text{(eqn. 4)}$$

for the case of frame to frame motion from time $t_0$ to time $t_1$.

Eqn. (4) signifies that a block under consideration at $x_0$, $y_0$ of a current frame $I_0$ (i.e., block $B_{0,0}(I_0)$), which has already been determined to be an occlusion block, represents a background region. This occlusion block may be "assigned" a motion vector ($mv^{t0,t1}$ ($x_0,y_0$)) from frame $I_0$ to $I_1$ which is the vector opposite of that block's motion vector ($mv^{t0,t-1}$ ($x_0,y_0$)) to the previous frame $I_{-1}$. The assigned mv is the "solved" mv, and may be subsequently used in an image processing application such as FRUC. Thus, in this example, the solution essentially involves assigning background motion to an occlusion block, where the background motion is obtained from a background block of a previous frame.

For instance, in FRUC, a block of an interpolated frame $I_{0-1}$ in between frames $I_0$ and $I_1$ may be mapped (projected) to the occlusion block via the assigned mv (as explained later in reference to FIG. 12). The mapped block of the interpolated frame, i.e. the "interpolated occlusion block" may then be assigned an mv of its own, which is mapped to the occlusion block of frame $I_0$ and which is the vector opposite of the solved mv.

To reduce the amount of data required, the interpolated frame $I_{0-1}$ may be expressed (and stored/output/transmitted) using only the mv's for each block, and without pixel values, where each mv is mapped to either a block of frame $I_0$ or frame $I_1$. (Interpolated blocks not mapped to occlusion blocks in $I_0$ or $I_1$ may be mapped to blocks of both frames $I_0$ and $I_1$, for pixel value averaging.) Ultimately, when the interpolated frame is rendered, the known pixel value(s) of the occlusion block $B_{0,0}(I_0)$ may be used for the pixel value(s) of the interpolated occlusion block. If there is zero background motion, the mapped interpolated occlusion block in frame $I_{0-1}$ would have the same coordinates as the occlusion block in frame $I_0$.

In FIG. 8, forward motion of foreground object FG is exemplified in the left direction, so that example occlusion Oc is a "front-end" occlusion block as noted earlier. On the other side of the foreground object, a "tail-end" occlusion block Oc' (at coordinates $x_i$, $y_j$) may be computed using an analogous method. Viewed another way, in the temporally reverse direction (the backwards direction), the occlusion region Oc' may be detected and similarly "solved". Motion vector 85 illustrates such motion. Motion vector 82 towards frame $I_2$ may be analogous to the backwards motion vector 72 when solving the occlusion. Ultimately, in the case of FRUC, pixel values in occlusion Oc' ($I_1$) may be used to populate a mapped interpolated occlusion block in the interpolated frame $I_{0-1}$ (akin to arrow 33 in FIG. 3A).

Thus, for motion in the reverse direction from time $t_1$ to time $t_0$, the occlusion Oc' may be solved by using motion from the next frame I2 using, $$mv^{t1,t0}(x_0,y_0) \leftarrow -mv^{t1,t2}(x_0,y_0) \qquad \text{(eqn. 5)}.$$

Experiments have shown, when occlusions are detected and solved according to the above embodiments in an FRUC application, artifacts such as blurring, halos, breakups, etc. that may otherwise exist in conventionally interpolated frames, may be reduced or eliminated.

Figure 9A:
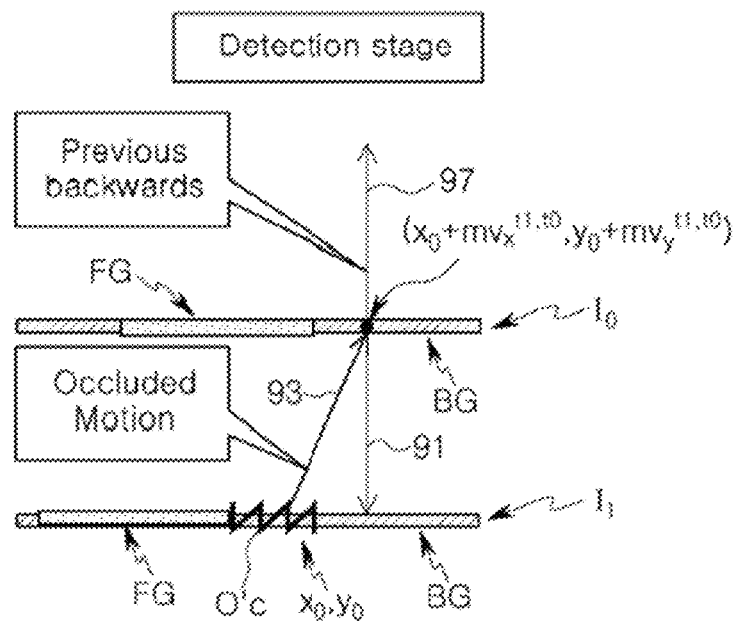
FIG. 9A illustrates an occlusion detection stage of an example three frame based occlusion detection and solution method.
Figure 9B:
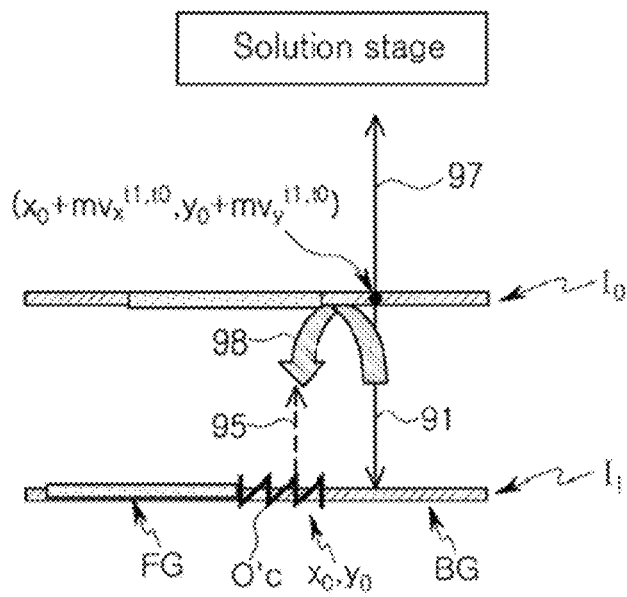
FIG. 9B illustrates an occlusion solution stage of the example three frame based occlusion detection and solution method.

FIGS. 9A and 9B illustrate a method of detection and solving occlusions using motion estimation with respect to only three sequential frames, rather than the four frame technique described above. This may be denoted a "three frame method" of solving "tail-end" occlusions Oc'. That is, the above scheme described in connection with FIG. 8 utilizes an algorithm for detecting and solving for front-end occlusions for motion field $mv^{t0,t1}$ using the motion field from a previous time step $mv^{t0,t-1}$. A symmetric scheme for tail-end occlusions (with regard to time) is used for motion field $mv^{t1,t0}$ using the motion field $mv^{t1,t2}$. For some applications, in particular online applications, this would necessitate a frame delay that might be too costly. An alternative solution for the "forward" motion field i.e. $mv^{t1,t0}$ that uses $mv^{t0,t-1}$ in place of $mv^{t1,t2}$ is as follows:

Let $mvs^{t1,t0}$ be motion field $mv^{t1,t0}$ after it has been solved for tail-end occlusions Oc' according to the "three frame" method described below. Here, occlusion conditions ("priors") for $mv^{t1,t0}$ may be:

1. Low reference count condition. $|\{(x,y)|\|(x,y)+mv^{t0,t1}(x,y)-(x_0,y_0)\|<\text{thresh1} \wedge \|mv^{t0,t1}(x,y)-mv^{t1,t0}(x+mv_x^{t0,t1}, y+mv_y^{t0,t1})\|<\text{thresh2}\}|<\text{occ\_thresh}$.
2. Difference from previous time step backwards motion condition. $\|mv^{t1,t0}(x_0,y_0)+mvs^{t0,t-1}(x_0,y_0)\|>\text{thresh}$.
3. Second order motion condition. $\|mv^{t0,t-1}(x_0,y_0)-mv^{t0,t1}(x_0+mv_x^{t0,t1},y_0+mv_y^{t0,t1})\|<\text{thresh}$.

As seen in FIGS. 9A and 9B, the occlusion Oc' may then be solved using the corresponding motion:

$$mv^{t1,t0}(x_0,y_0) \leftarrow -mv^{t0,t1}(x_0+mv_x^{t1,t0},y_0+mv_y^{t1,t0}).$$

In the occlusion detection stage of the three frame based method example illustrated in FIG. 9A, mv 93 represents $mv^{t1,t0}$ ($x_0,y_0$) of condition 2 above (the mv projected from occlusion block Oc' at $x_0$, $y_0$ of $I_1$; mv 97 is an example of $mv^{t0,t-1}$ ($x_0,y_0$); (shown drawn from ($x_0+mv_x^{t0,t1}$,$y_0+mv_y^{t0,t1}$) for clarity of illustration) which is the previous time step motion from the end point of mv 93 at $I_0$; and mv 91 represents the second order motion, i.e., $mv^{t0,t1}$ ($x_0+mv_x^{t0,t1}$, $y_0+mv_y^{t0,t1}$).

In the solution stage depicted in FIG. 9B, path 98 illustrates that the occlusion Oc' is solved by assigning the inverse of mv 91 to Oc' as mv 95 according to condition 3 above.

Motion Errors Detection.

While the above-described embodiments are able to disambiguate occlusions from non-occlusion areas, errors in the motion field that are not occlusions may not be detected. For many applications erroneous motions result in severe artifacts such as break-up artifacts in FRUC frames and thereby in the overall FRUC-generated video.

A motion error detection method according to the present technology may alleviate these types of problems. The method is based on a premise that motion vector fields at the edge of an occlusion have a tendency to either contract or expand. Once occlusions have been solved using the methods described herein, it is generally unexpected to find regions of rapid expansion and contraction in motion fields. The algorithm herein detects such regions and marks them as errors. The method may characterize expansion/contraction using the motion divergence field. Rapid expansion and contraction regions may be detected by a zero crossing in the divergence field.

Figure 10:
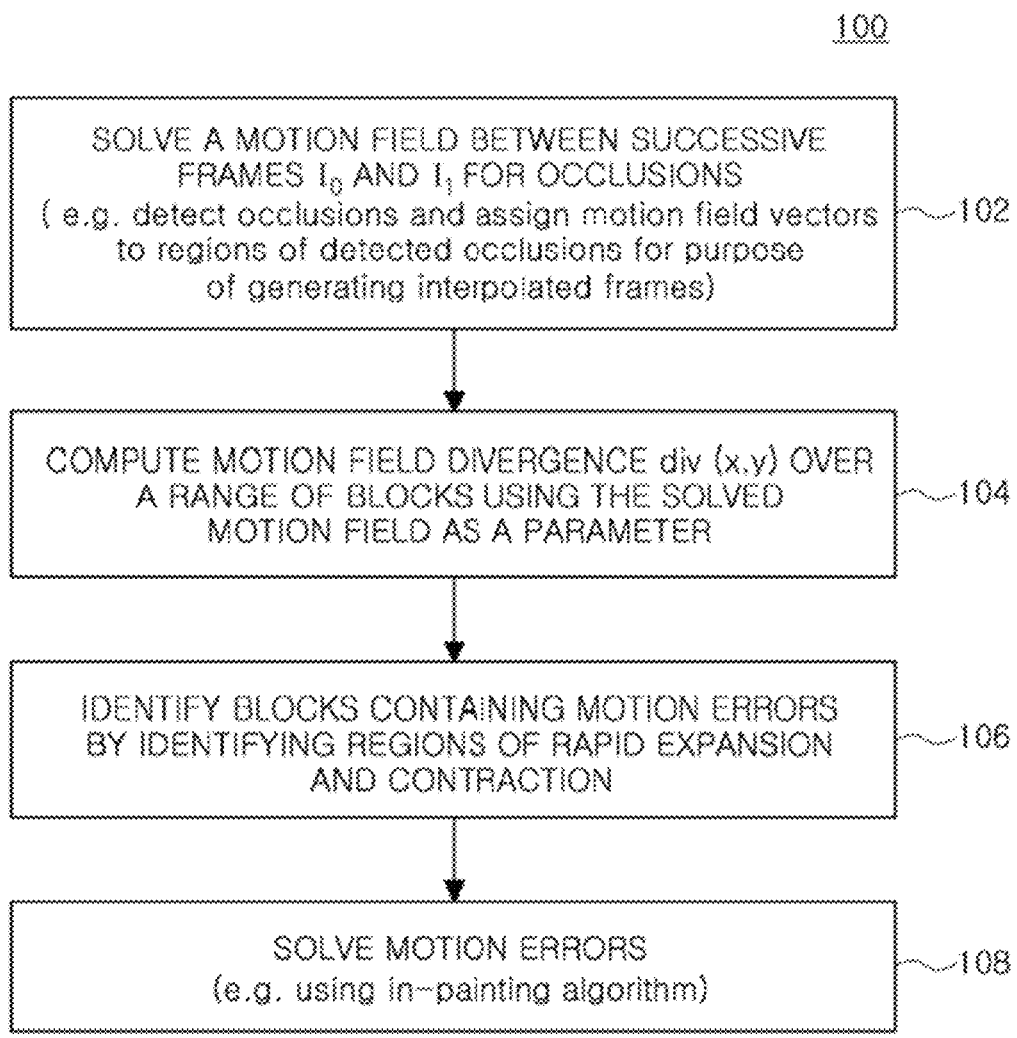
FIG. 10 is a flow chart of an example method of detecting and solving motion errors.

FIG. 10 is a flow chart of an example method, 100, of detecting and solving motion errors according to the present technology. A motion field between successive frames $I_0$ and $I_1$ may first be solved for occlusions in operation 102. Preferably, this is done according to the methods described hereinabove; however, it is contemplated that method 100 could be used in conjunction with other occlusion detection and solution schemes. Solving a motion field may involve detecting occlusions and assigning motion field vectors to the detected occlusion regions for the purpose of generating interpolated frames, as discussed earlier, or for some other purpose. Next, in operation 104, a motion field divergence div (x,y) may be computed over a range of blocks using the solved motion field as a parameter. Thereafter, operation 106 may identify blocks containing motion errors by identifying regions of rapid expansion and contraction, using the divergence field. This may involve detecting a zero crossing of div (x,y).

In particular, operations 102, 104 and 106 may be carried out according to the following:

1. Let $mvs^{t_1,t_0}$ be motion field $mv^{t_1,t}{}_0=(u,v)$ after it has been solved for occlusions. Then, $div(x,y) \equiv div(mvs(x,y))=du/dx(x,y)+dv/dy(x,y)$ is the motion field divergence at (x,y).

2. $(x_0,y_0)$ is a zero crossing of div(x,y) iff: $\max\{div(x_0+x,y_0+y) | |x|<N, |y|<N\}<thresh$ and $\min\{div(x_0+x,y_0+y) | |x|<N, |y|<N\}<-thresh$, for a predefined neighborhood of blocks N×N and for a positive threshold thresh.

As an example, divergence of motion vectors may be understood with reference to FIG. 5 discussed earlier. Divergence in FIG. 5 is apparent at the interface of the moving foreground object, in which slanted mv 51 represents the motion, and where mv 51 diverges from vertically oriented mv 53 representing zero motion. When a motion vector field of two adjacent bodies moving away from each other is considered, then the vector field at the interface is expanding (e.g. as a source in fluid dynamics). On the other hand, if two bodies moving into each other are considered, it may be said that the field is contracting (e.g., as a sink). When considering an occlusion, it may be said that a moving object creates an occlusion in the direction of its movement (a sink/contraction/closing) but the moving object is also revealing the background in the opposite direction to its movement (behind it). Thus, the revealed area may be called a source (or an expansion or an opening).

The zero crossing of a divergence field may be understood by considering three adjacent pixel blocks: a center block, a left side block and a right side block. If the mv of the center block represents zero or a low value of motion, the right side block's mv is a large positive value and the left side block's mv is a large negative value, a zero crossing may be said to exist at the center block. Since positive and negative mv's aren't expected for pixels so close to one another, the zero crossing may be indicative of a motion estimation error.

With continued reference to FIG. 10, in operation 108, motion errors may be solved, so as to reconstruct the corresponding erroneous regions. In solving the erroneous motions, an objective may be to create a smooth motion vector field. As an example, motion errors may be solved by using a known in-painting algorithm. In-painting may be done from the erroneous region's edge. In-painting is common in machine vision algorithms for reconstructing lost parts in an image. Many types of these algorithms exist, such as an isotropic diffusion algorithm similar to Poisson Solver (which was used to generate the experimental frames of FIGS. 11A and 11B).

Following the solution of the motion errors at 108 (and the substitution of corrected motion vectors for the erroneous ones), in the case of FRUC, interpolated frames may thereafter be constructed. In an alternative embodiment, FRUC is performed prior to solving for motion errors using divergence. In this case, after the occlusions are detected and solved, the motion field is first interpolated to the interpolation coordinates, and only then are the errors found and solved via the divergence field (carried on the interpolated motion field). In this alternative embodiment, FRUC frame construction may be performed between operations 102 and 104 in FIG. 10; and thereafter, motion errors may be solved in 104, 106, 108 and the errors corrected.

Figures 11A, 11B:
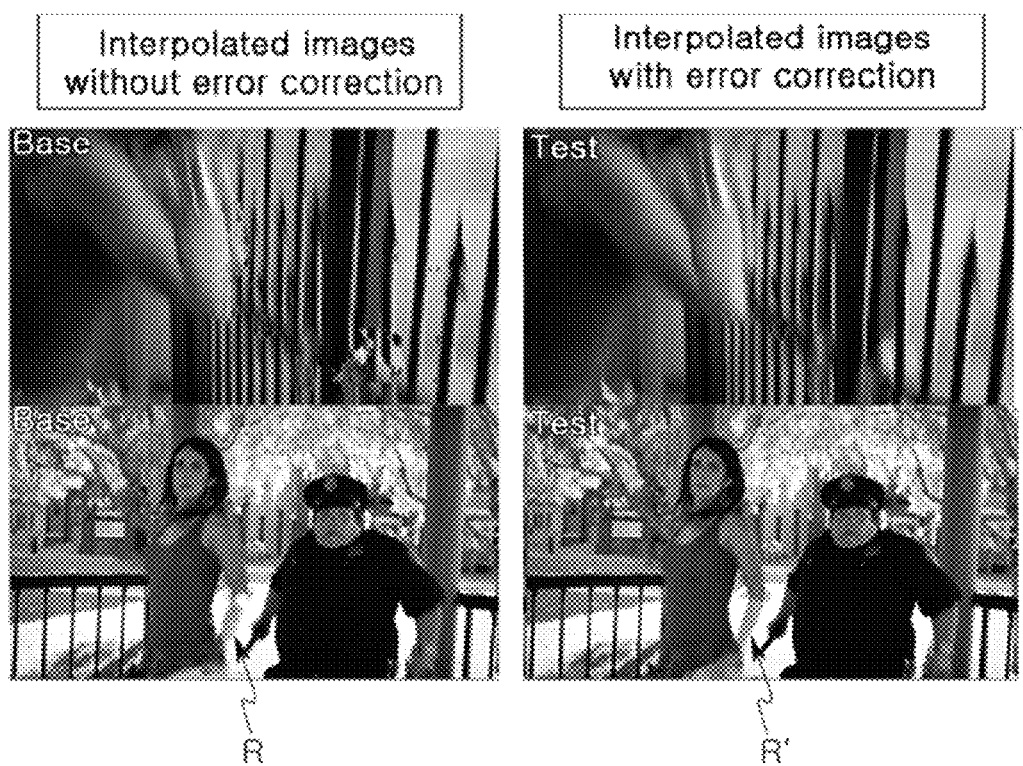
FIG. 11A shows experimental FRUC interpolated image frames without error correction.
FIG. 11B shows the same frames of FIG. 11A with error correction performed by an embodiment.

FIG. 11A shows experimental FRUC interpolated image frames without error correction. The top image is seen to have significant break-up; the bottom image has visible break-up in the region R of the woman's arm. FIG. 11B shows the same frames with error correction performed by an embodiment of the present technology described above. It is seen that the break-up is significantly improved in the upper image, and the region R' of the lower image is significantly smoother.

Embodiments of methods according to the present technology have been described in connection with an FRUC example. However, the above-described occlusion detection and solution methods, with or without the motion errors detection based on divergence, may be applied to various non-FRUC applications that utilize motion vectors. Other examples include but are not limited to change detection, 3D rendering, image fusion/super resolution, and video compression. Change detection in video (e.g. for video summarization or surveillance) involves registration of images and image subtraction, and errors in motion estimation will cause errors in detection. In 3D rendering, if occlusion is not detected than it leads to object thickening. Image fusion/super resolution uses many images to generate a single higher resolution image. Errors in registration will cause artifacts in the generated image. Accordingly, the technology disclosed herein may reduce or eliminate errors in these and other applications as well.

Figure 12:
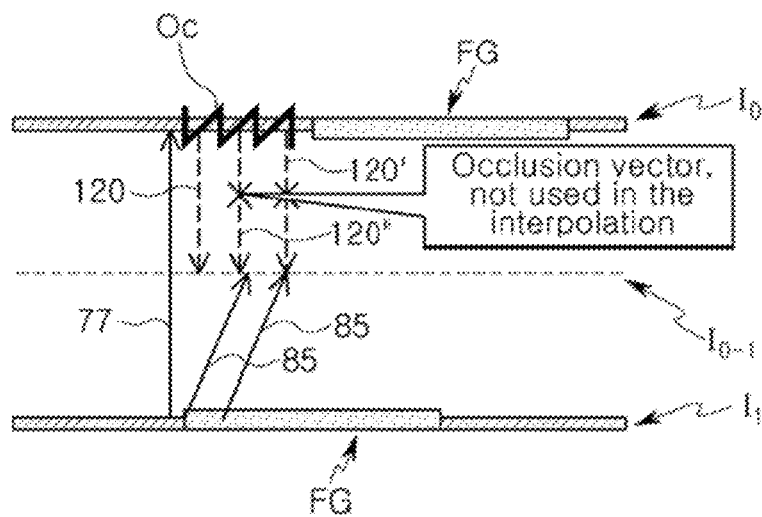
FIG. 12 illustrates generation of an interpolated FRUC frame according to an embodiment.

FIG. 12 illustrates generation of an interpolated FRUC frame according to an embodiment. In FRUC motion vectors fields may be calculated between consecutive frames in a video in order to generate an interpolated image between the original image frames. This scheme is known as motion compensation. In FIG. 12, an intermediate frame $I_{0-1}$ is generated between consecutive original frames $I_0$ and $I_1$.

According to a motion compensation scheme of the present technology, in order to generate an intermediate frame, an interpolated motion vector field is first calculated in the intermediate time stamp. An example algorithm for this calculation is as follows:

Let $mvs^{t_0,t_1}$ and $mvs^{t_1,t_0}$ be motion vector fields that have been solved for occlusions as described above. Let $occ^{t_0,t_1}$ and $occ^{t_1,t_0}$ be the binary occlusion maps. Let $t_0<t_i<t_1$ be the interpolation time stamp. An interpolated motion field may be defined as mvi. Set $\alpha_0=(t_i-t_0)/t_1-t_0$ and $\alpha_1=(t_1-t_i)/t_1-t_0$, then $mvi(x_0,y_0)=fun(\{(x,y) | \|(x,y)+\alpha_0 \cdot mvs^{t_0,t_1}(x,y)-(x_0,y_0)\|<thresh \wedge \|(x,y)+\alpha_1 \cdot mvs^{t_1,t_0}(x,y)-(x_0,y_0)\|<thresh\})$ with ƒun the interpolation function. ƒun is a function of the group of motion vectors whose target is some interpolation coordinate. Occlusion information may be combined by using occlusion vectors in the interpolation only if all vectors in the interpolation group are occlusions. Otherwise, some of the occlusion vectors may not be used. This is depicted in FIG. 12, which may be assumed to show the same motion of a foreground object FG as in FIG. 8. Assume motion vectors 120, 120' and 120" represent solved motion vectors for successively arranged blocks in the detected occlusion region Oc. However, since motion vectors 120' and 120" respectively map to the same coordinates of the intermediate frame $I_{0-1}$ as those mapped to by blocks of the foreground object FG (as indicated by the intersection of mv 85 with mv's 120' and 120" at the intermediate frame location), the mv's 85 are used rather than the mv's 120' and 120" in constructing the intermediate frame $I_{0-1}$.

Figure 13:
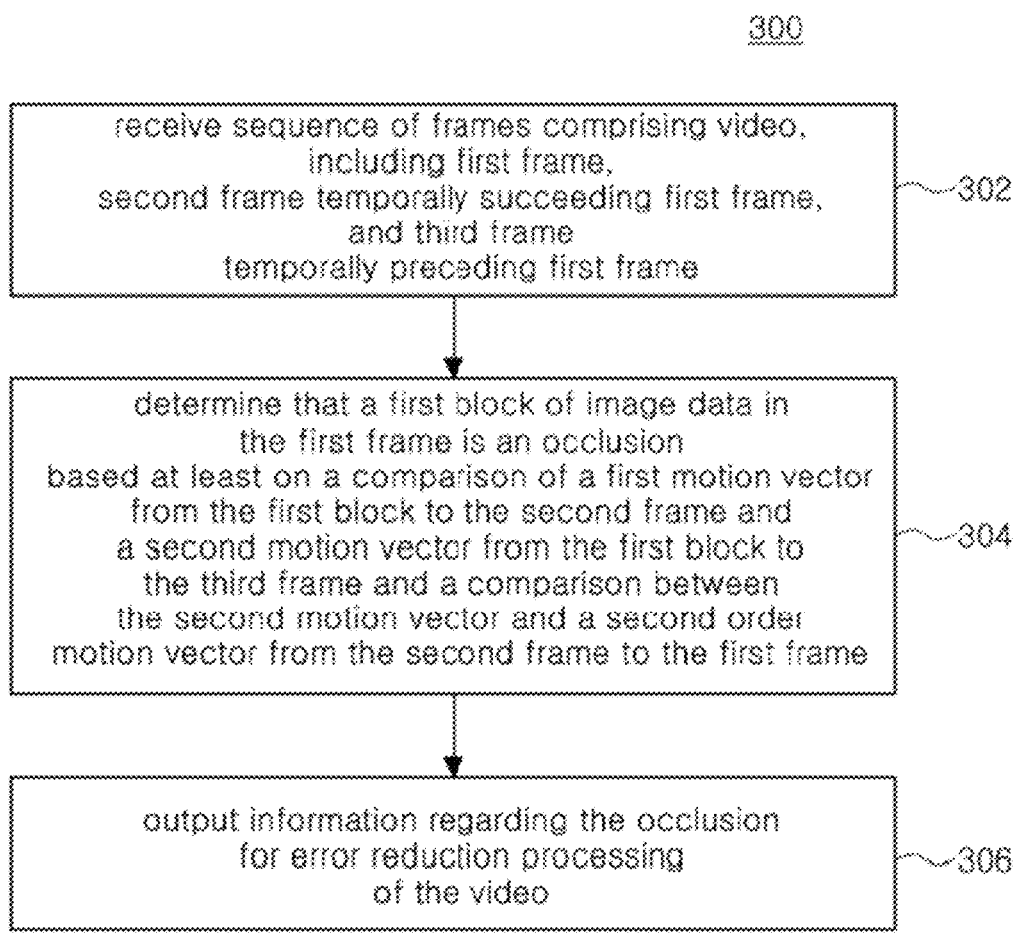
FIG. 13 is a flow chart of an exemplary processor-implemented method of detecting occlusions according to the present technology.

FIG. 13 is a flow chart of an exemplary processor-implemented method, 300, of detecting occlusions according to the present technology. In operation 302, the processor receives a sequence of frames comprising video, including a first frame (e.g. $I_0$), a second frame (e.g. $I_1$) temporally succeeding the first frame, and third frame (e.g., $I_{-1}$) temporally preceding the first frame. In operation 304, the processor determines that a first block of image data in the first frame is an occlusion based at least on (i) a comparison of a first motion vector from the first block to the second frame and a second motion vector from the first block to the third frame, and (ii) a comparison between the second motion vector and a second order motion vector from the second frame to the first frame. In operation 306, the processor outputs information regarding the occlusion (e.g., occlusion coordinate data) for subsequent error reduction processing of the video (e.g., "solving" the occlusions by assigning motion vectors to the occlusions as described above, and applying the assigned motion vectors to an FRUC processing circuit).

Figure 14:
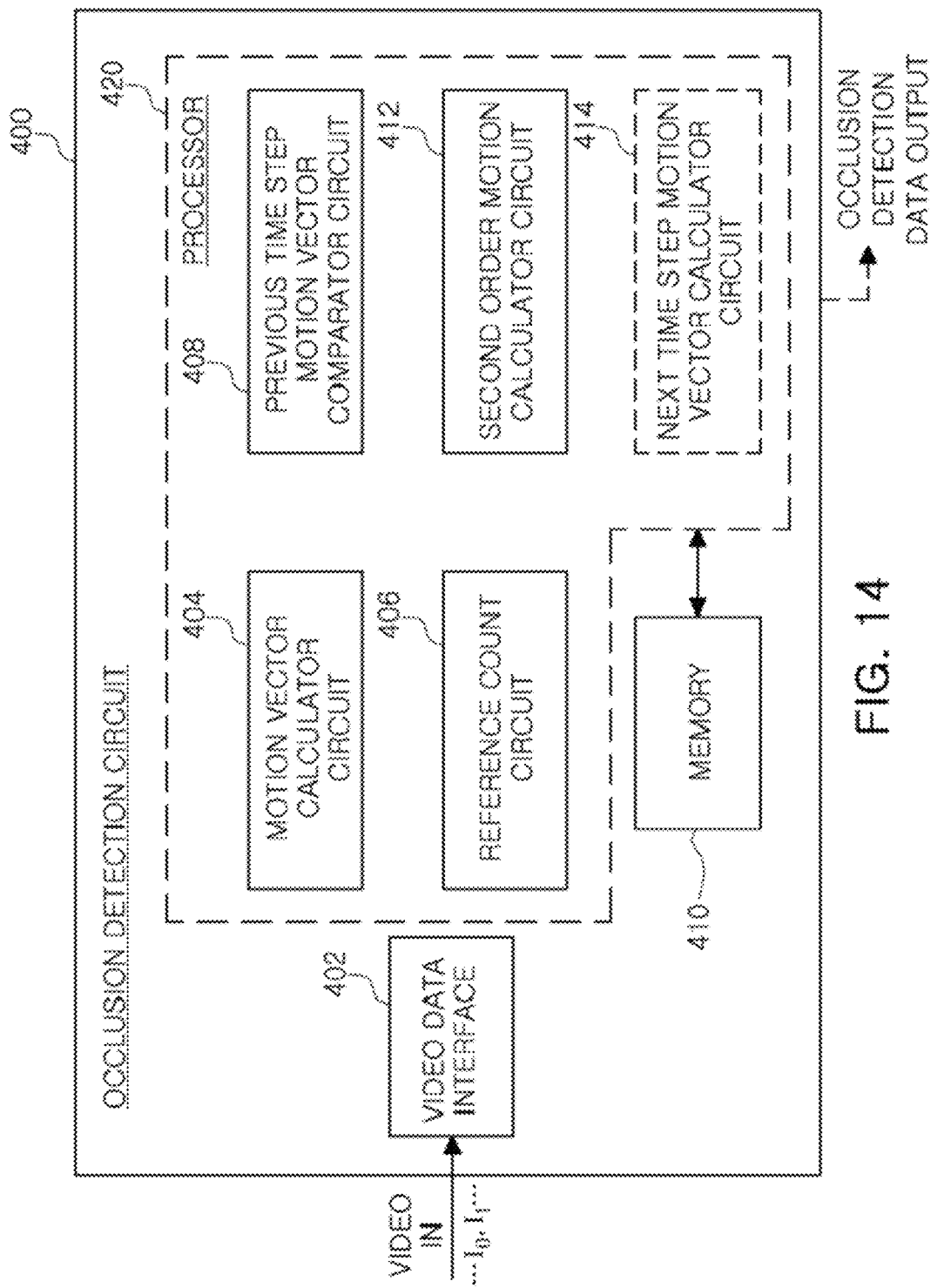
FIG. 14 is a schematic block diagram of an example occlusion detection circuit according to the present technology.

FIG. 14 is a schematic diagram of an example occlusion detection circuit according to the present technology. Occlusion detection circuit 400 may perform occlusion detection in accordance with any of the methods according to the present technology discussed above (e.g., described in connection with FIGS. 7A, 7B, 7C, 8, 9A and 9B). Circuit 400 may include a video data interface circuit 402 that receives input video frames $I_{-1}, I_0, I_1$, etc. A motion vector calculator circuit 404 may calculate any of the motion vectors discussed above using, e.g., block matching which may be done independently for each of the video frames. A reference count circuit 406 may perform the above-described reference counting to detect a preliminary occlusion for a block of pixels under consideration. A previous time step MV comparator circuit 408 may compare motion vectors between a current frame $I_0$ and a previous frame $I_{-1}$ as discussed earlier. A second order motion calculator circuit 402 may calculate second order motion vectors such as 77 in FIG. 7D. An optional next time step motion vector calculator circuit 414 may compute mv's with respect to a next time frame I2, as in the four-frame based method embodiment of FIG. 8. (In the three frame embodiment, circuit 414 may be omitted.) Memory 410 may be used to buffer input and output data and store intermediate data and/or instructions used in the processing operations by the other circuits 404, 406, 408, 412 and 414.

Occlusion detection circuit 400 may be embodied as a stand-alone integrated circuit, e.g., an application specific integrated circuit (ASIC), a Field-Programmable Gate Array (FPGA), or a programmable-logic device. Alternatively, occlusion detection circuit 400 may be embodied within a processor 420 (a processing circuit) of a general purpose computing device that has loaded program instructions from a memory causing the processor 420 to be configured to implement the above-described methods, in which case the general purpose computing device is converted to a special purpose computing device that detects and optionally solves occlusions.

Figure 15:
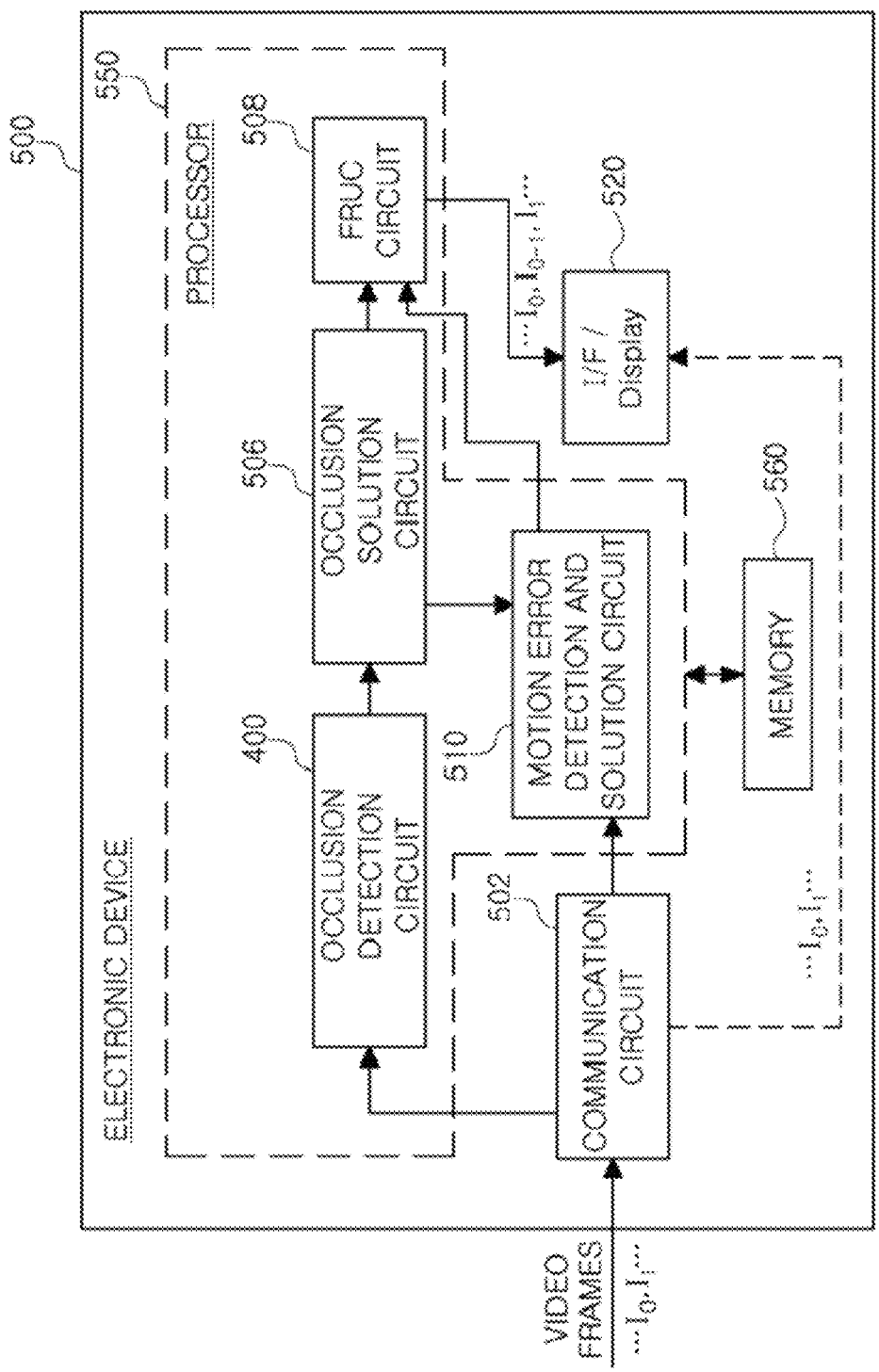
FIG. 15 is a schematic block diagram of an example electronic device according to the present technology.

FIG. 15 is a schematic diagram of an example electronic device according to the present technology. Electronic device 500 may include a communication circuit 502 that receives input video frames $I_{-1}, I_0, I_1$, etc., e.g., from a network or a video storage device. The frames are provided to occlusion detection circuit 400, e.g., the same circuit of FIG. 14 just described. An occlusion solution circuit 506 may "solve occlusions" as described in the methods above. A motion error detection circuit 510 may detect and solve motion errors as described for FIG. 10. An FRUC circuit 508 may generate interpolated frames such as $I_{0-1}$. Original frames $I_0, I_1$, etc. may be provided to a display 520 (either directly from communication circuit 502 or via FRUC circuit 508), along with the intermediate frames from FRUC circuit 508. Display 520 may display the input video which has been enhanced through FRUC (e.g., the video frames seen in FIG. 11B above). Circuits 506, 508 and 510 may be part of a common processor 550 (e.g. a general processing circuit or dedicated computational hardware) which is coupled to a memory 560 that may store data used in the processing operations. Memory 560 may also contain program instructions which are loaded into processor 550 to execute the methods described herein. In the case where the occlusion detection and motion error detection using divergence is applied to non-FRUC application such as change detection, 3D rendering, super resolution or image fusion, FRUC circuit 508 may be replaced with a non-FRUC image processing circuit suitable for the particular application.

Electronic device 500 may be any device capable of receiving input video data, processing it according to the methods described above, and outputting, storing and/or displaying video, such as a smart TV, a general computer, a smart phone, a set-top box, a medical imaging apparatus, and so on. If implemented as a general purpose computing and display device, occlusion detection circuit 400, and circuits 506, 508 and 510 may be embodied within processor 550 of the general purpose computing device that has loaded program instructions from a memory (e.g. 560) causing the processor 550 to be configured to implement the above-described methods, in which case the general purpose computing device is converted to a special purpose computing device that detects and solves occlusions, detects and solves motion errors (via a processing circuit portion of processor 550 configured as circuit 510) and FRUC enhances the video.

Accordingly, an electronic device according to the present technology may include, at least: memory; and at least one processor circuit coupled to the memory and configured to: detect occlusions within a first frame with respect to a second, temporally subsequent frame of a series of frames for generating video, by determining that a first block of image data in the first frame is an occlusion based at least in part on a comparison of a first motion vector from the first block to the second frame and a second motion vector from the first block to a third frame temporally preceding the first frame, and a comparison between the second motion vector and a second order motion vector from the second frame to the first frame; and output information regarding the occlusion for error reduction processing of the video.

Further, an electronic device according to the present technology may include, at least: memory; and at least one processor circuit coupled to the memory and configured to: detect an occlusion in a video frame and assign a motion vector to the occlusion; and identify a block containing a motion error by computing a motion field divergence using the assigned motion vector. The at least one processor circuit may be further configured to solve the motion error, e.g., using an in-painting algorithm, and reconstruct an erroneous region corresponding to the block. The at least one processor circuit may be further configured to perform frame up rate conversion (FRUC) following the reconstruction of the erroneous region. Alternatively, FRUC may be performed subsequent to the occlusion detection but prior to the identification of a block of image data containing a motion error. The occlusion may be detected and a motion vector assigned to the occlusion based on priors that: (i) occlusion motion vectors are different than other background motion vectors; (ii) occlusion motions have a likelihood of being similar to foreground occluding motion by more than a threshold; and (iii) motion estimation will match an occlusion block with a block belonging to a common background object.

Exemplary embodiments are described herein with reference to signal arrows and block diagrams and algorithmic expressions. Each block of the block diagrams, and combinations of blocks in the block diagrams, and operations according to the algorithmic expressions can be implemented by hardware accompanied by computer program instructions. Such computer program instructions may be stored in a non-transitory computer readable medium that can direct a computer, other programmable data processing apparatus, or other devices to function in a particular manner, such that the instructions stored in the computer readable medium produce an article of manufacture including instructions which implement the function/act specified in the flowchart and/or block/schematic diagram.

The term "processor" as used herein is intended to include any processing device, such as, for example, one that includes a central processing unit (CPU) and/or other processing circuitry (e.g., digital signal processor (DSP), microprocessor, etc.). Moreover, the term "processor" may refer to a multi-core processor that contains multiple processing cores in a computing device, and that various elements associated with a processing device may be shared by other processing devices.

The above-described methods according to the present technology can be implemented in hardware, firmware or via the use of software or computer code that can be stored in a recording medium such as a CD ROM, RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing described herein.

While the technology described herein has been particularly shown and described with reference to example embodiments thereof, it will be understood by those of ordinary skill in the art that various changes in form and details may be made therein without departing from the spirit and scope of the claimed subject matter as defined by the following claims and their equivalents.

What is claimed is:

1. A method performed by a processor, of detecting occlusions within a first frame with respect to a second frame, temporally subsequent to the first frame, of a sequence of frames of video, the method comprising:
   determining that a first block of image data in the first frame is an occlusion based at least on a comparison of a first motion vector from the first block to the second frame and a second motion vector from the first block to a third frame of the sequence of frames temporally preceding the first frame, and a comparison between the second motion vector from the first block to the third frame, and a second order motion vector from the second frame to the first frame; and
   outputting information regarding the occlusion for error reduction processing of the video.

2. The method of claim 1, further comprising solving the occlusion by assigning a motion vector equaling an inverse of the second motion vector to the occlusion.

3. The method of claim 2, further comprising performing motion error detection by calculating divergence of a motion field using the assigned motion vector.

4. The method of claim 1, wherein the comparison of the first motion vector from the first block to the second frame and the second motion vector from the first block to the third frame involves determining whether a magnitude of the first motion vector from the first block to a matching, second block of the second frame, exceeds a magnitude of the second motion vector from the first block to a matching block of a third frame by more than a first threshold.

5. The method of claim 1, wherein said determining that a first block of image data is an occlusion represents a final determination that the occlusion should be output for the error reduction processing, and the method further comprising:
   prior to the final determination, preliminarily determining whether the first block is an occlusion based on motion vectors between the first frame and the second frame, wherein the final determination is made only if the first block is preliminarily determined to be an occlusion.

6. The method of claim 5, wherein the preliminary determining is based on reference counting of candidate motion vectors with respect to the first block by a processor-implemented algorithm.

7. The method of claim 5, wherein the comparison of the first motion vector from the first block to the second frame and the second motion vector from the first block to the third frame involves determining whether a magnitude of the first motion vector from the first block to a matching, second block of the second frame, exceeds a magnitude of the second motion vector from the first block to a matching block of a third frame by more than a first threshold.

8. The method of claim 7, wherein the comparison between the second motion vector and a second order motion vector from the second frame to the first frame involves determining whether a magnitude difference between the second motion vector and the second order motion vector is below a second threshold, if so, designating the preliminarily determined occlusion as a final occlusion for further processing and generation of the video.

9. The method of claim 1, wherein the error reduction processing is performed in connection with frame rate up conversion (FRUC).

10. The method of claim 1, wherein the error reduction processing is performed in connection with at least one of video compression, frame rendering, image fusion, and change detection.

11. An electronic device comprising:
memory; and
at least one processor circuit coupled to the memory and configured to:
detect occlusions within a first frame with respect to a second frame, temporally subsequent to the first frame, of a series of frames for generating video, by determining that a first block of image data in the first frame is an occlusion based at least in part on a comparison of a first motion vector from the first block to the second frame and a second motion vector from the first block to a third frame temporally preceding the first frame, and a comparison between the second motion vector from the first block to the third frame, and a second order motion vector from the second frame to the first frame; and
output information regarding the occlusion for error reduction processing of the video.

12. The electronic device of claim 11, wherein the determining that a first block of image data is an occlusion is based on priors that: (i) occlusion motion vectors are different than other background motion vectors; (ii) occlusion motions have a likelihood of being similar to foreground occluding motion by more than a threshold; and (iii) motion estimation will match an occlusion block with a block belonging to a common background object.

13. The electronic device of claim 11, wherein the error reduction processing is performed in connection with at least one of video compression, frame rendering, image fusion, change detection, and frame up rate conversion (FRUC).

14. The electronic device of claim 11, wherein the at least one processor circuit is further configured to:
solve the occlusion by assigning a motion vector equaling an inverse of the second motion vector to the occlusion; and
perform motion error detection by calculating divergence of a motion field using the assigned motion vector, and solve the motion error and reconstruct an erroneous region corresponding thereto.

* * * * *